US006765868B1

(12) United States Patent
Dunn et al.

(10) Patent No.: US 6,765,868 B1
(45) Date of Patent: Jul. 20, 2004

(54) SYSTEM AND METHOD FOR LARGE FILE TRANSFERS IN PACKET NETWORKS

(75) Inventors: James M. Dunn, Ocean Ridge, FL (US); Alan G. Ganek, Chappaqua, NY (US); Colin George Harrison, Brookfield, CT (US); Edith H. Stern, Boca Raton, FL (US); Barry E. Willner, Briarcliff Manor, NY (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/158,279

(22) Filed: Sep. 22, 1998

(51) Int. Cl.[7] .................................................. H04J 3/14
(52) U.S. Cl. ....................... 370/230; 370/235; 370/352; 370/400; 370/468; 370/474; 370/477
(58) Field of Search ......................... 370/220, 235–236, 370/352–356, 468, 473, 474, 230, 389, 392, 400–406, 431, 229, 394, 477

(56) References Cited

U.S. PATENT DOCUMENTS

| | | | | |
|---|---|---|---|---|
| 4,862,914 A | | 9/1989 | Weingarten | 137/544 |
| 4,896,863 A | | 1/1990 | Riplinger | 242/68.7 |
| 5,034,106 A | | 7/1991 | Nyberg | 204/129.2 |
| 5,282,207 A | * | 1/1994 | Jurkevich et al. | |
| 5,311,513 A | * | 5/1994 | Ahmadi et al. | |
| 5,430,277 A | | 7/1995 | Ohno et al. | 235/382 |
| 5,526,350 A | | 6/1996 | Gittins et al. | 370/58.1 |
| 5,602,851 A | | 2/1997 | Terashita et al. | 370/403 |
| 5,638,363 A | | 6/1997 | Gittins et al. | 370/358 |
| 5,680,400 A | | 10/1997 | York | 370/473 |
| 5,742,160 A | | 4/1998 | Bergstedt et al. | 324/207 |
| 5,751,712 A | | 5/1998 | Farwell et al. | 370/431 |
| 6,038,217 A | * | 3/2000 | Lyles | |
| 6,091,709 A | * | 7/2000 | Harrison et al. | |
| 6,115,372 A | * | 9/2000 | Dinha | 370/352 |
| 6,351,454 B1 | * | 2/2002 | Crocker et al. | 370/235 |

FOREIGN PATENT DOCUMENTS

| | | |
|---|---|---|
| GB | 0 762 281 A2 | 12/1997 |
| JP | 7-64846 | 10/1995 |
| JP | 8-307451 | 11/1996 |
| WO | WO 95/32573 | 11/1995 |

OTHER PUBLICATIONS

IBM Technical Disclosure Bulletin vol. 40, No. 11, Nov. 1997, p. 125–126, entitled "Method for Web Browser to Project Download Times & Adjust Behavior Accordingly".
"Internetworking with TCP/IP"; Douglas Comer; Prentice Hall, Englewood Cliffs, NJ. (pp. 1–7).
"Digital Telephony" by J. Bellamy; John Wiley & Sons, Inc. New York, NY 1991, Section 9.2.

* cited by examiner

*Primary Examiner*—Dang Ton
*Assistant Examiner*—Inder Pal Mehra
(74) *Attorney, Agent, or Firm*—Joseph C. Redmond, Jr.; Morgan & Finnegan, LLP

(57) ABSTRACT

A packet switching network, e.g., the Internet, employs bandwidth managers to provide guaranteed bandwidth reservations to paired forwarding and receiving agents interfacing with sending and receiving stations in the transfer of large data files therebetween. The forwarding agents obtain guaranteed reservations from the bandwidth manager for segments of the large data file which are transmitted to the receiving station in accordance with the respective reservations. The receiving agent reassembles the segments into the large data file for delivery to the receiving station. By segmenting the large data files, using guaranteed bandwidth reservations on different links or multiple networks, the transmission of large data files through packet switching networks is accomplished without adversely impacting the service requirements of other network users. Reservations and concomitant transmissions are arranged up to the capacity of the network for the attachment which maximizes the transmission ability and allows the network to distribute the bandwidth usage to prevent network congestion.

15 Claims, 7 Drawing Sheets

Network with Bandwidth Managers

Network with Bandwidth Managers

Network Segmented to Subnetworks,
each with an Agent Pair

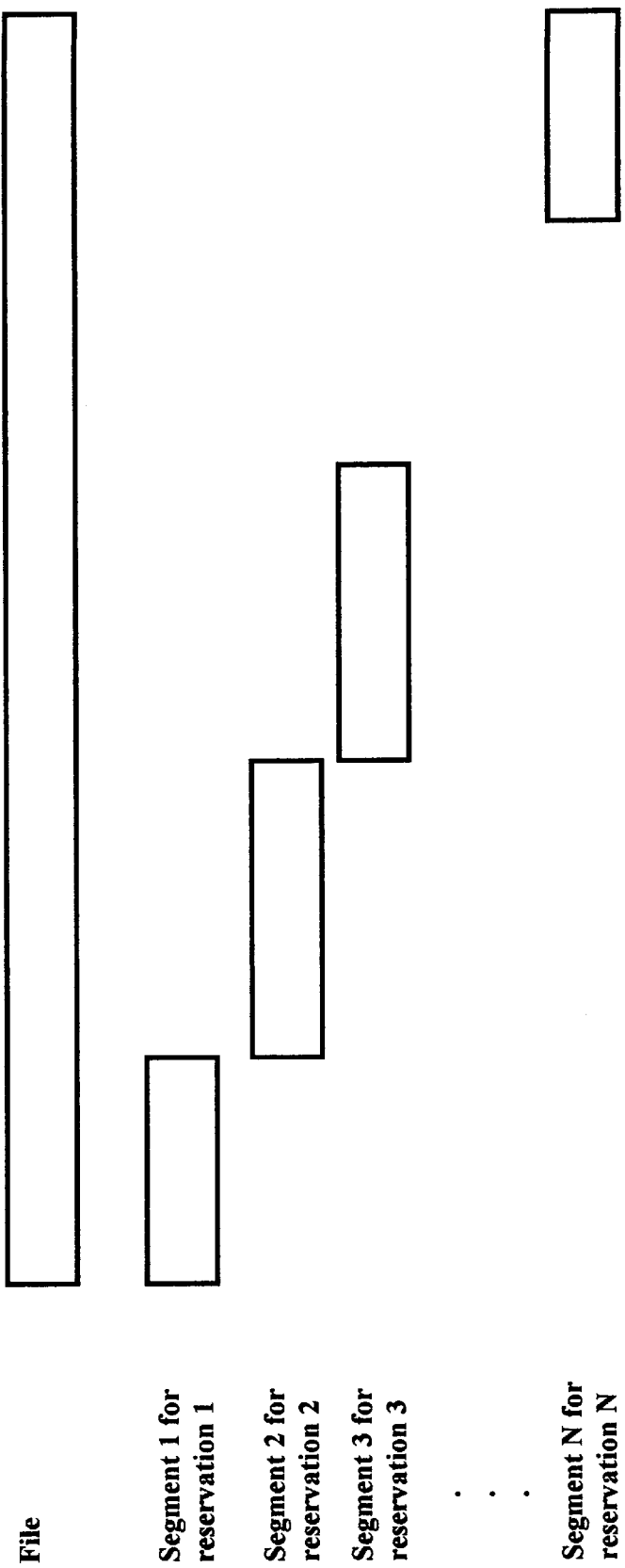

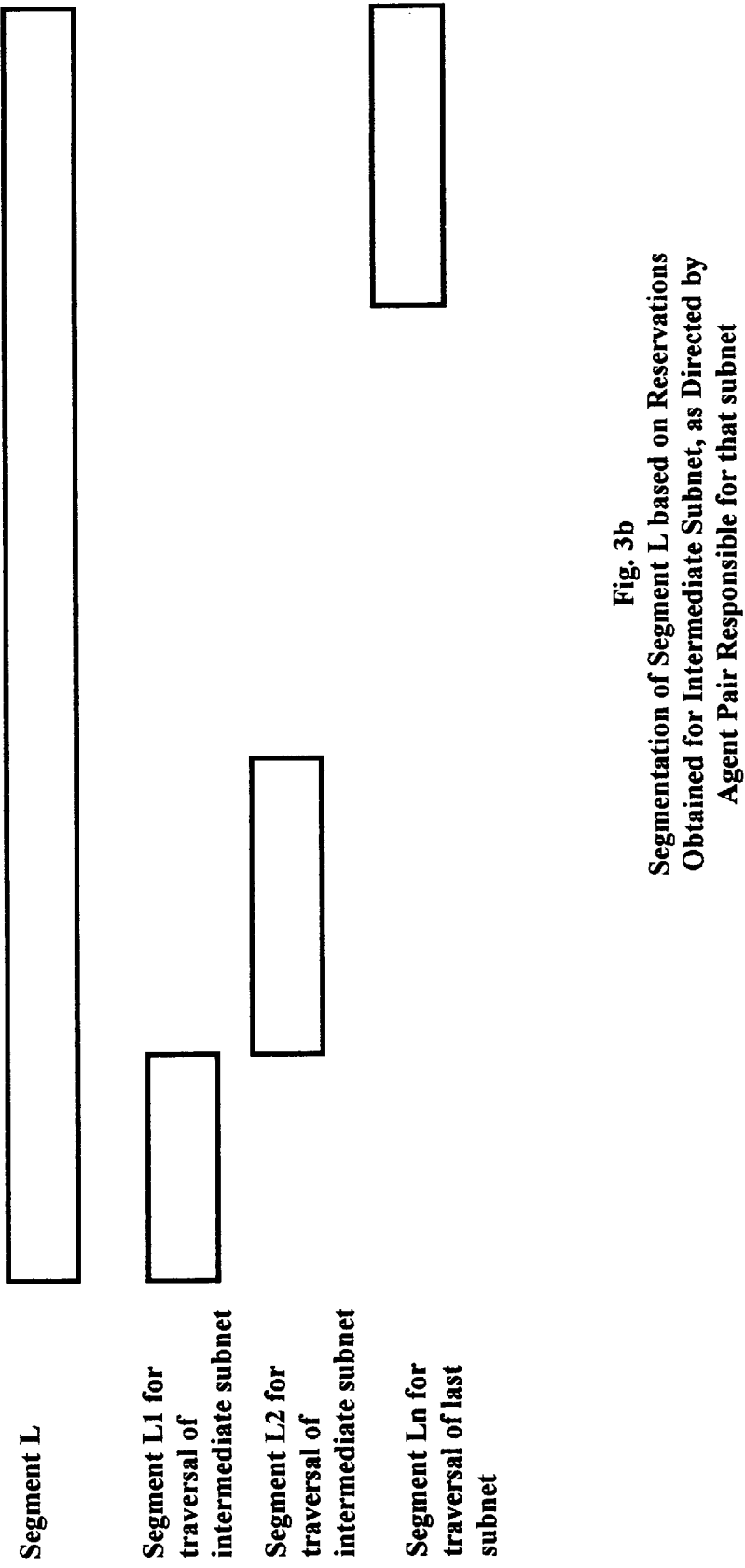

SYSTEM AND METHOD FOR LARGE FILE TRANSFERS IN PACKET NETWORKS

BACKGROUND OF THE INVENTION

1. Field of Invention

This invention relates to information networks. More particularly, the invention relates to a system and method for improving large file transfers in packet networks while protecting service requirements of network users.

2. Description of Prior Art

Packet switching networks using, for example, the Internet Protocols, transport large data objects in the form of packets in which the data to be transmitted is fragmented into individual packets of data, each packet having a unique identification (Id) and carrying its own destination address. In this manner, each packet, representing a fragment of the large data object can go by a different route to the destination. The packets may also arrive in a different order than the order in which they were shipped. The packet Id lets the data be re-assembled in proper sequence. A further description of packet switching is described in the text "Internetworking with TCP/IP", Douglas Comer, Prentice Hall, Englewood Cliffs, N.J. Also see "Digital Telephony" by J. Bellamy, published by John Wiley & Sons, Inc., New York, New York, 1991, and described in Section 9.2.

Today, considerable difficulty exists in transferring large files (>10 MB) through packet switching network, such as the Internet or Intranet using E-mail or standard File Transfer Protocol (FTP). Many PC applications contain one or more components greater than 10 MB. WINZIP (a trademark of Nico Mak Computing Inc. of Bristol, Connecticut) files which are collections of files comprising a complete application are often this size. Digital video contents may be hundreds of megabytes or even gigabytes. While the senders and receivers of such large files recognize that their transfer will require significant time, they nonetheless desire a service which will guarantee delivery by a specific time. The transfer of large files lasting many minutes or even hours is susceptible to failure due to network congestions which last several seconds or minutes. Such failures are likely to necessitate the re-start of the entire file transfer. The transfer of smaller files is statistically less likely to encounter such problems and the penalty for having to re-start small transfer is relatively smaller. Large transfers can also cause problems in inter-network access points where intermediate packet re-ordering and re-assembly may occur because there may be insufficient local storage available. As the information transfer requirements continue to increase, network congestion and poor service is experienced. Applications requiring guaranteed bandwidth such as Internet telephony, and streaming audio and video, often perform poorly due to network congestion, which is exacerbated by large file transfers, as it is difficult to efficiently multiplex very large and very small packets on the same links while maintaining quality of service guarantees. Transferring a large file may consume all available bandwidth to the detriment of other users.

Network designers and standards groups are working towards mechanisms that will prevent the large user of bandwidth from affecting the service of others. These mechanisms include end-to-end bandwidth reservation, as well as maximum ingress bandwidth to the network. The mechanisms which prevent the transfer of large files from affecting other users exacerbate the difficulty users have in transferring large files or knowing how long their file transfer will take. Accordingly, a need exists in information networks, e.g., the Internet, to optimally transfer large files without difficulty while protecting the service requirements of other users in the network.

Demand for multimedia services, such as audio and video streaming and interactive collaborative services is creating the need for managing the quality of service in packet switched communication networks for the real-time flow of small packets of audio and video (and possible other kinds of data). This management will be performed by bandwidth managers on a link-by-link or global basis. The goal of the bandwidth manager is to ensure that requests by applications or users for guaranteed transmission performance (throughput, latency, packet loss rates, and so forth) can be met in concert with existing resource reservations. In effect, the bandwidth managers will allow users to get guarantees for the transmission of data at a priority higher than the traditional "best efforts" service; typically the user will pay a premium for such a service. The purpose of this invention is to exploit these emerging network capabilities to meet the needs of large file transfer.

Prior art related to large file transfers in computer networks includes the following:

U.S. Pat. No. 5,526,350 issued Jun. 11, 1996, discloses a telecommunications network having a plurality of switches for switching different types of traffic, such as audio data including voice data, fax and modem originated data, digital computer originated data and video data. A communication link connects a user's site to the network, and a bandwidth manager is provided to multiplex traffic of different types for transmission over the link. After transmission over the link, a complementary bandwidth manager is arranged to de-multiplex the traffic for application to the respective switches. The bandwidth manager is arranged to dynamically allocate bandwidth to the different types of traffic, thereby optimizing the available bandwidth provided by the communications link.

U.S. Pat. No. 5,680,400 issued Oct. 21, 1997, discloses a high speed data transfer mechanism for transferring files from a transmission host across a data link to a receiver host. Data is presented to a data splitter. The data splitter separates the data streams into N separate substreams by packaging data in packets which may be of different sizes. As data is packetized, each packet is sent and presented to a separate data transmitter. Data is sent to the array of transmitters in round-robin fashion such that the data is first presented to the first transmitter, then to the second transmitter, and so on until each transmitter has sent a packet, and all data packets have been sent to a transmitter. A receiving side then initializes the receivers as needed, or as many data receive substreams as are required, using as many receivers as are available. A substream reassembly unit reassembles the packets into a final output stream.

European Application 0762281 published Dec. 3, 1997, discloses a method of selectively obtaining formatted dump data from a remote software product using an agent representing the remote software product and a manager representing a local customer/vendor management station. A dump object is defined by the agent and exposed to the manager for modification. Modification of the dump object causes the agent to selectively create/store a formatted storage dump for one or more software product components. The manager retrieves the formatted dump data from the agent using a standard file transfer mechanism. Since the dump data is formatted by the agent, the problem of transmitting large amounts of data across a network is minimized or eliminated.

PCT Application WO 95/32573 published Nov. 30, 1995, discloses transferring a series of data files between two computers, each computer provided with a file transfer mechanism. Each file transfer mechanism controls the transfer of a series of files in accordance with a protocol. In this protocol, the computer receiving data files (the initiator) sends a poll message to the computer transmitting the data files (the responder). In response, the responder sends a reply message to the initiator containing a list of files which are available for transfer. From the list, the initiator selects the files it wishes to receive and then copies each file in turn. The initiator then sends an acknowledgement to the responder.

JP 8-307451 published Nov. 22, 1996, discloses data transmission systems employing large scale networks such as the Internet by determining optimum transfer demands by a client machine raising network utilization efficiency and reducing data access time.

U.S. Pat. No. 5,751,712 issued May 12, 1998 and filed Oct. 26, 1996 discloses a communication system administering control on bandwidth allocation to multimedia data. The bandwidth is partitioned into three bands dedicated to audio, video and data traffic in accordance with blocking probabilities associated with the respective media types. The value of each blocking probability is selected pursuant to the relative importance of the associated media type. With blocking probabilities in place , the dominance of a particular type of media traffic which may not be important would not cause blocking of traffic of other media types which may be relatively important.

None of the prior art discloses bandwidth managers and forwarding/receiving agents, which segment and reassemble large files, thereby enabling the file to be transmitted as multiple, smaller segments over one or more networks links using priority reservations, where available, as provided by the bandwidth manager thereby protecting the service demands of other network users during the large file transfer.

SUMMARY OF THE INVENTION

An object of the invention is an information network and method of operation which provides large file transfers without altering the service requirements of network users.

Another object is an information network, e.g., the Internet, having forwarding and receiving networks and multiple network attachments which optimize transmission of large files over the multiple networks.

Another object is a packet network and method of operation for large file transmissions managed by forwarding and receiving agents.

Another object is a packet network and method of operation for large file transmissions managed by forwarding and receiving agents on guaranteed bandwidth reservations provided by bandwidth managers.

Another object is a packet network and method of operation in which large file transmission are segmented and re-assembled for multiple network link transmissions by forwarding and receiving agents.

Another object is a packet switching network and method of operation having forwarding and receiving agents matching the segmentation of a file to a bandwidth reservation obtained from a network bandwidth manager.

Another object is a packet switching network and method of operation having forwarding and receiving agents optimizing the transmission of large files across sub-networks of a packet switching network divided into sub-networks.

These and other objects, features and advantages are achieved in a computer network, e.g. a packet network which may be a unitary or a segmented network with multiple paths and a bandwidth manager for each segment of the network. The bandwidth manager provides a sender coupled to the network with a guaranteed bandwidth reservation up to some maximum bandwidth, for example, 64 kbps or 512 kbps, for the transfer of any kind of data to a receiver over a single or multiple network paths. The manager will usually impose a maximum reservable bandwidth which is small compared to the total bandwidth of the network, so as to allow large numbers of such reservations to be handled simultaneously on behalf of many users. The use of bandwidth reservation enables the large file transfer service to guarantee that the file will be delivered by a specific time. By segmenting large files they may be allocated to multiple bandwidth reservations. The more immediate the required delivery time, the greater the number of reserved channels. Large files may therefore be transmitted over one such resource channel or in this invention over multiple such channels. Both the sender and receiver include file forwarding and receiving agents which interact with the bandwidth manager to obtain such guaranteed bandwidth reservations for intact file transfers or segmented file transfers over the network or network segments using single or multiple network paths. The agents manage the file transmission over the multiple reserved channels and perform segmentation and reassembly of transferred files. The agents also match the file intact or segmented to the associated bandwidth reservation. Where the sender and receiver are coupled to multiple overlaid networks, each of which connects the sender and receiver, the agents interacts with bandwidth managers of the different network to obtain guaranteed bandwidth reservations for intact file transfer or segmented file transfers over single or multiple paths in different networks. Forwarding and receiving agents optimize transmission of large files over multiple networks served by a host computer.

DESCRIPTION OF DRAWING

The invention will be further understood from a detailed description of a preferred embodiment taken in conjunction with an appended drawings, in which:

FIG. 3A is a representation of a large file divided into multiple segments with each segment being available for transmission via a separate bandwidth reservation on the network or networks of FIG. 1.

FIG. 3B is a representation of a subsegmentation of a segment based on reservations obtained for intermediate subnets, as directed by agent pair responsible for that subnet in the network of FIG. 2.

DESCRIPTION OF PREFERRED EMBODIMENT

Figure 1:
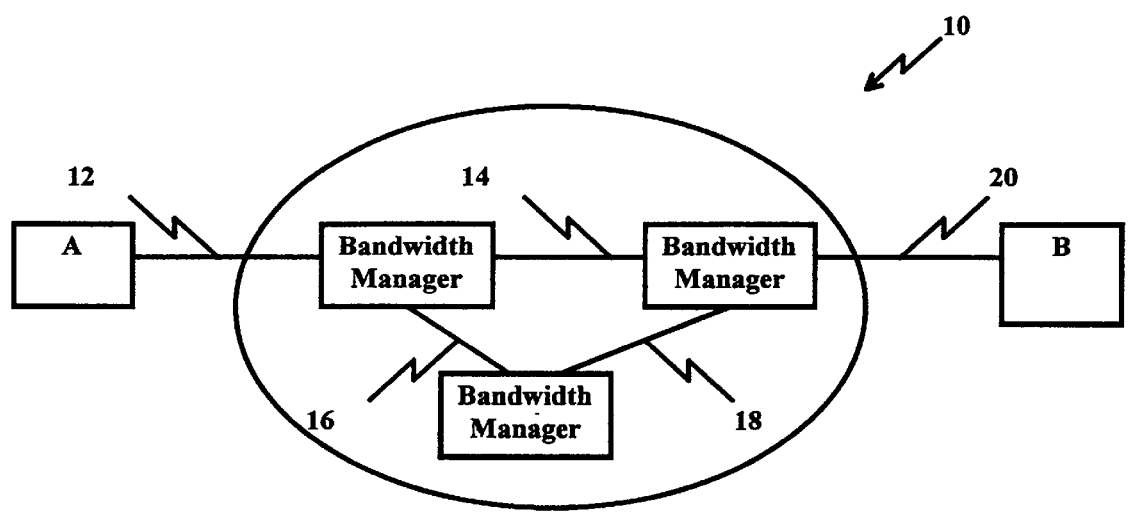
FIG. 1 is a representation of a packet network in which bandwidth managers are employed to manage prioritization of different classes of traffic for large file transfer in accordance with the principles of the present invention.

In FIG. 1, an information network, e.g. a packet switch network 10 connects station A to station B through links 12, 14, 16 using bandwidth managers 20, 30, 40. Bandwidth managers are designed to regulate and assure the amount of traffic from each host up to some maximum rate; limit and report on the bandwidth utilization by a host running the Internet Protocols. For example, in a Local Area Network (LAN) environment, an Aponet Bandwidth Manager, Model 10, manufactured by Aponet, Inc. Wien, Austria supports 10 Mbps Ethernet bandwidth in monitoring, reporting, limiting and controlling features. Such bandwidth managers support large file transfers between stations A and B using guaranteed bandwidth reservation software, e.g., Resource ReSeR-Vation Protocol (P) (RSVP), issued by the Internet Engineering Task Force A (RSVP Working Group) as described in Request For Comments (RFC 2208). RSVP provides resource reservations for isochronous traffic over the network. RSVP is issued by routers to bandwidth managers to deliver quality of service requests to all nodes along the path(s) of the flow and to establish and maintain a state to provide a requested service.

Figure 2:
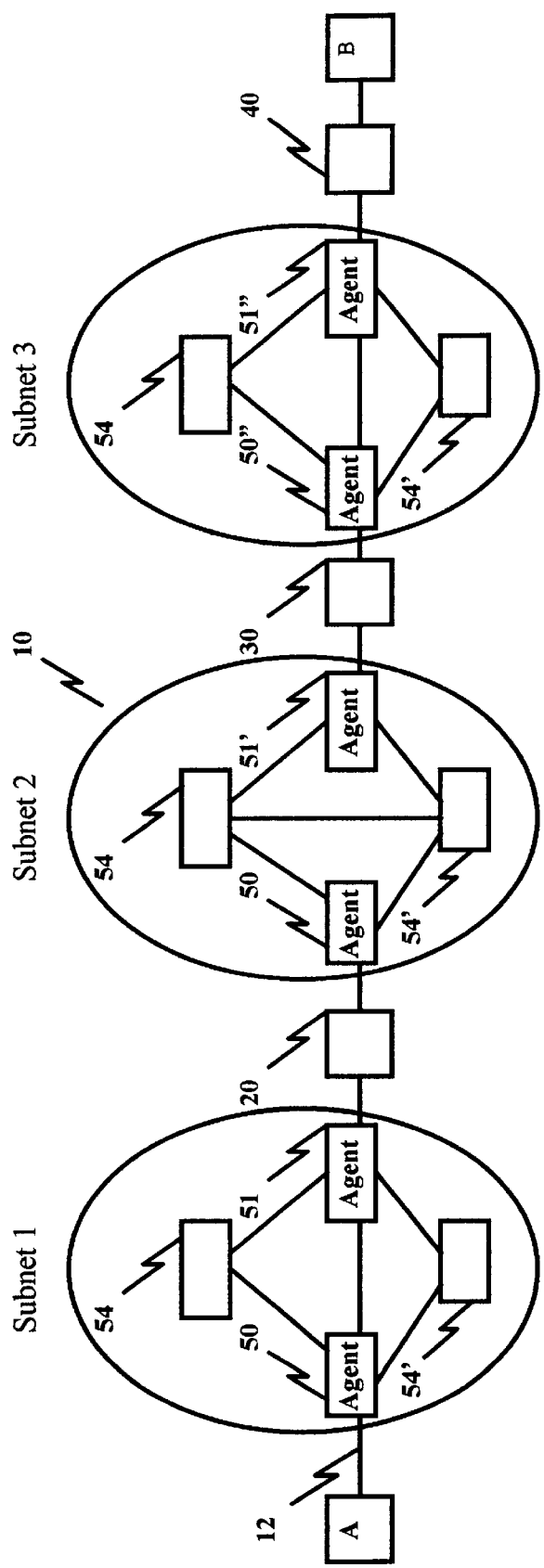
FIG. 2 is a representation of the packet network of FIG. 1 divided into several sub-networks with each sub-network incorporating a file forwarding and receiving agent to manage the transmission of large files.

In FIG. 2, sub-networks 1, 2, and 3 may be different networks, that is, station A may be connected to a private corporate network 1 while station B maybe connected to a different corporate network 5. Networks 1 and 3 may be connected to another network, such as the Internet. Each sub-network includes an agent 50 at the entrance point and an agent 51 at the exit point of the sub-network. The agents work in pairs. The agent 50 represents the sender and is designated a forwarding agent. The agent 51 represents the receiver and is designated a receiving agent. The forwarding/receiving agents segment the file and transmit or receive the segments, respectively, potentially in parallel over multiple paths in the same or different networks. The agents work synergistically with the bandwidth manager mechanism for bandwidth managers 20, 30, 40, using the RSVP reservation protocol, to make optimum use of the bandwidth for the sender or originator to transfer a file. The use of interim agents 54, 541 allows transmission of file segment to be further optimized by additional segmentation.

In FIG. 3A, a file 60 is divided into segments 1, 2, 3, ... N, each segment having a guaranteed bandwidth obtained through an adjacent bandwidth manager. Each segment proceeds on the same or a different link in a network according to the reservation provided by the bandwidth manager.

For example, station A may request a reservation from a bandwidth manager to transmit 1 megabyte/30 seconds. The manager may deny this request as too resource consuming. The manager may then request two reservations over different links for 0.5 megabits/30 seconds. This request may be permissible for the network, allowing lesser usage on two routes traversing the network. Effectively, A is transmitting at 1 megabyte, however, the network has guaranteed lesser usage, and has potentially protected its ability to provide service for others.

Parallel transmission will result in segments of the file being received asynchronously and potentially out of order at the receiving station B. Returning to FIG. 2, the agent 51" serving station B reassembles the file based on either information contained in the file segments or based on control information sent independently by agent 50". Station B, of course, can receive only up to the capacity of its attachment to the network. Normal throttling mechanisms prevent station B from being overwhelmed.

The reservations obtained by A may each end at a different time. As the data transmission to each path loses its guarantee, the agent 50 again requests the maximum reservation it can obtain up to the capacity of the network. In this fashion, agent 50 adapts to the changing bandwidth guarantee that the network is able to offer.

If stations A and B have connections to multiple networks, agent 50 can further optimize the transmission. Where A is connected to "N" networks, for example, if A is connected to the first network having a bandwidth capacity C1, to a second network having a bandwidth capacity of C2, and further to the "Nth" network with bandwidth capacity $C_n$, then the agent 20 can seek reservations from each network up to the capacity of that attachment. Accordingly, the connection to multiple networks allows maximum transmission from station A.

If a network has been divided into sub-networks with multiple agent pairs, then each segment may be further optimized in successive sub-networks. As shown in FIG. 3B, if file segment L has been received from originator A at the location of agent 20, it may be necessary to further segment L for optimal transmission across sub-network L. That is, the transversal of sub-network L is managed for file segment L as if agent 50 were the originator and agent 54 were the receiver. Multiple parallel paths for sub-segments $L_1$, $L_2$, $L_N$ etc. may be chosen through the sub-network L to optimize the traversal and arrange for the most rapid delivery of L at the agent 51.

Where networks do not have bandwidth management mechanisms, an agent will allocate to that path a file segment which it expects will be readily transmittable based on the capacity of the connection and policies related to past performance of the network in connection. Agents may be co-located with the originator and receiver or may reside elsewhere within the network. Agents may be provided as a service based on a network server for the users at the edge of the network. In this case, many agents for many users will be collated at the server.

Figure 4:
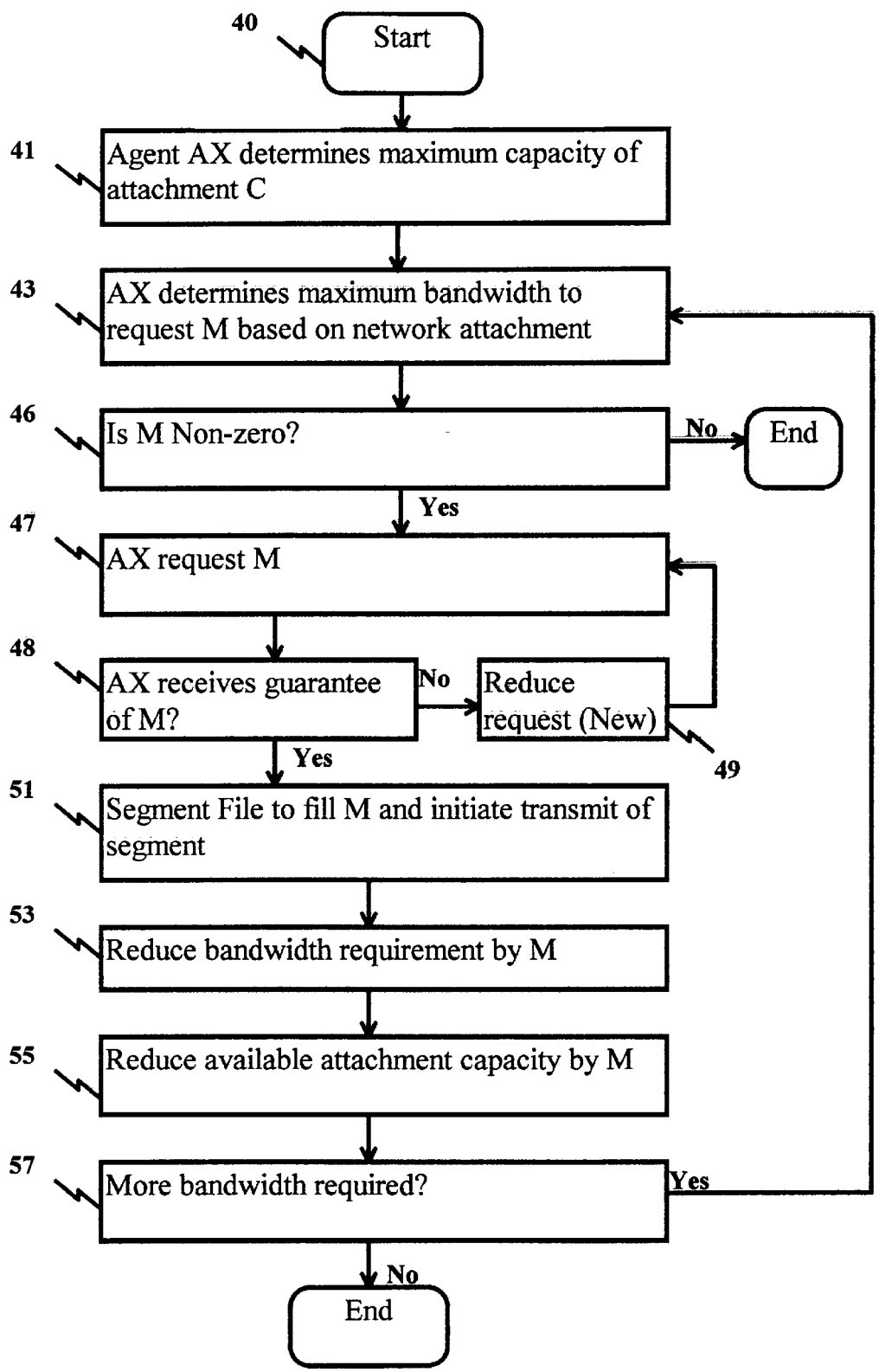
FIG. 4 is a flow diagram for a file forwarding agent requesting a bandwidth reservation from a bandwidth manager.

FIG. 4 discloses a process for an agent located at a server and requesting a bandwidth reservation from a bandwidth manager for a data transmission. The process is entered at step 40 and proceeds to step 41 in which the agent Ax determines the maximum capacity of an attached device C, e.g. telephone, data terminal, etc. In a step 43, the agent determines the maximum bandwidth (M) to request based on the network and attachment. A test 46 is performed to determine if M is non-zero. A "no" condition ends the process. A "yes" condition initiates a step 47 to request M from the bandwidth manager. A test 48 is performed to determine whether the bandwidth manager provided a guaranteed reservation of M. A "no" condition initiates a step 49 to reduce the request to M' and return to step 47. The process cycles until the agent receives a guaranteed reservation, whereupon a "yes" condition initiates a step 51 to segment the file M and initiate transmission of the file segments. In a step 53 the bandwidth manager reduces the available bandwidth by M; and in a step 55, reduces the available attachment capacity by M. A test 57 is performed to determine if more bandwidth is required. A "yes" condition returns the process to step 43. A "no" condition ends the process.

Figure 5:
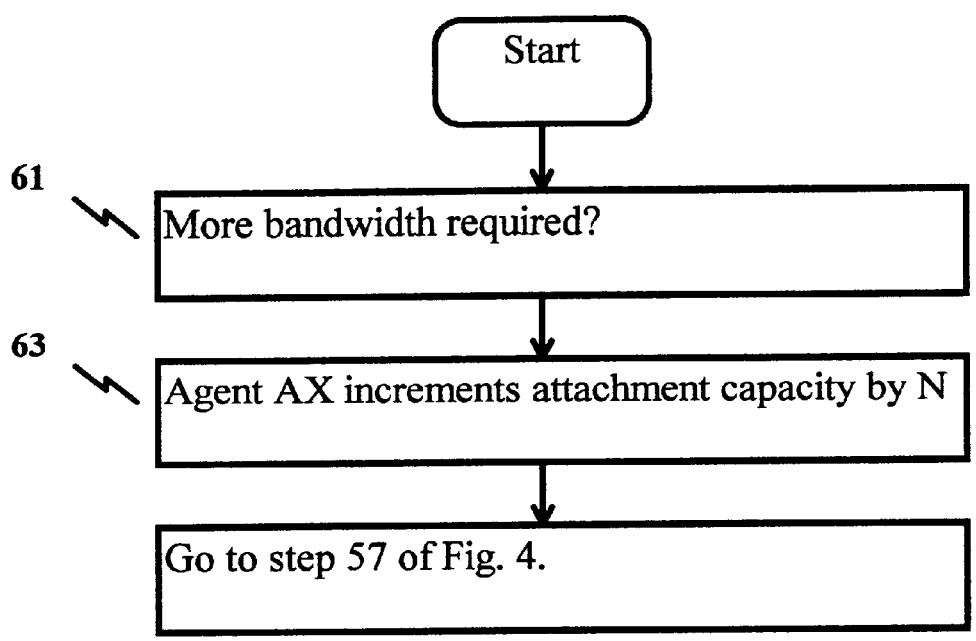
FIG. 5 is a flow diagram for a file forwarding agent when a bandwidth reservation expires.
Figure 6:
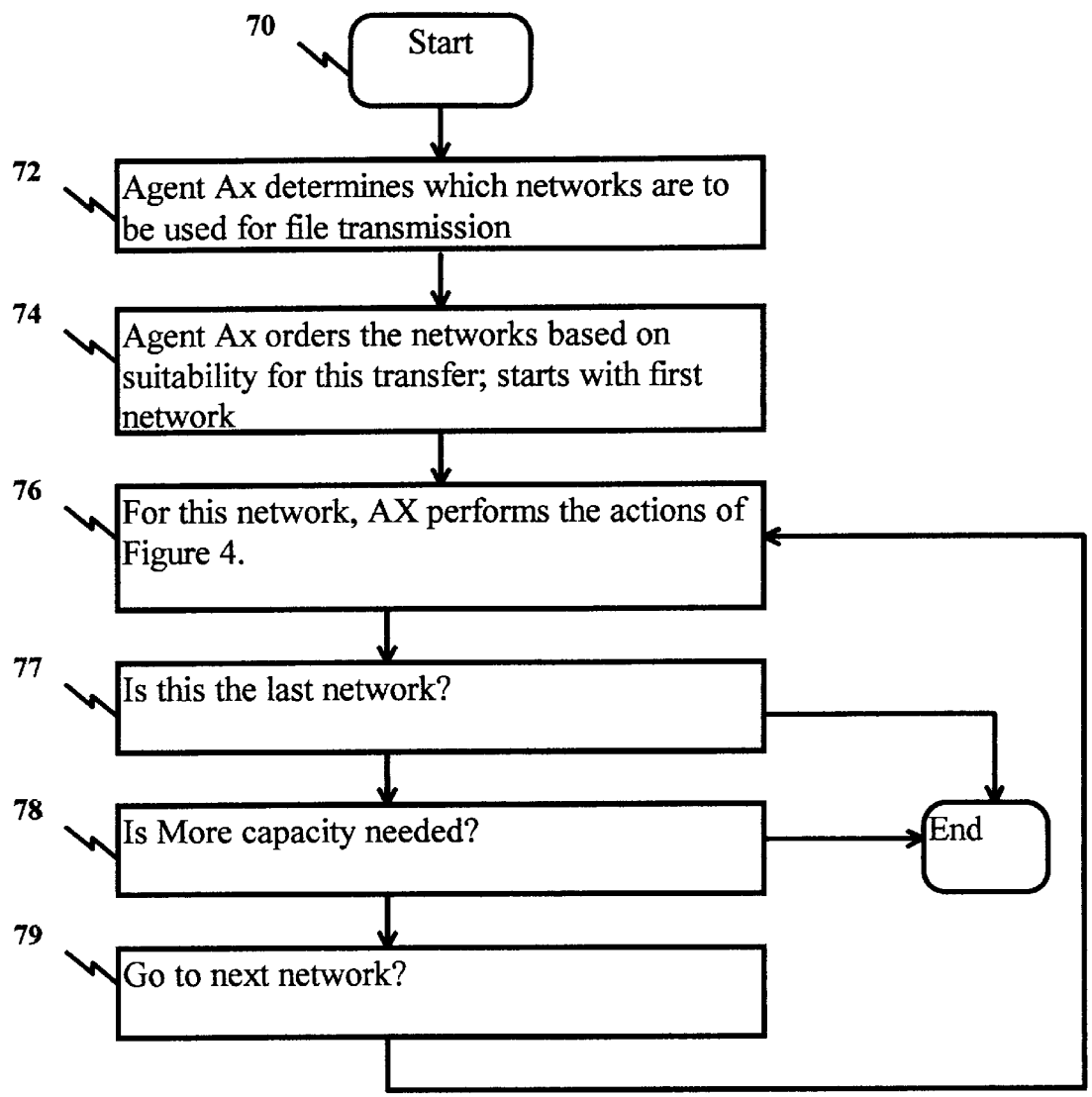
FIG. 6 is a flow diagram for a file forwarding agent requesting bandwidth reservation across multiple sub-networks.

In FIG. 5, an agent located in a transmission link monitors the bandwidth reservations and identifies those or that reservation, e.g reservation "N" which expire in a step 61, after which in step 63 the agent increments the attachment capacity by N and enters step 57 in FIG. 4 to obtain more bandwidth using the process of FIG. 4.

Where stations A and B have connections to multiple networks, an agent can further optimize the transmission of large data files using the process shown in FIG. 6. The process is entered in a step 70, after which in step 72, the agent determines which networks are to be used for file transmissions. After network determination, the agent in step 74 alters the reservation in the network based on the suitability for the transfer; starting with the first network. In step 76, the agent performs the process of FIG. 4 for the first network. In a step 77, the process determines if the last network has been subject to the process of FIG. 4. A "yes" condition ends the process; a "no" condition initiates a step 78 to determine if more network capacity is needed. A "no" condition ends the process; a "yes" condition initiates a step 79 to go to the next network and perform the process of FIG. 4 after which the process ends in step 77.

Summarizing, a system and method of have been disclosed for large file transfers in packet networks, e.g., the Internet, without adversely affecting the service requirements of other network users. The system employs bandwidth managers in one or more different networks providing guaranteed bandwidth reservations for large segmented files by a forwarding agent and subsequent reassembly by a receiving agent for a receiving station. By segmenting the large files and using different networks to transmit the segments to the receiving agent for reassembly, the bandwidth capacity for the network is not substantially reduced to the point where the service requirements of other users are affected. Reservations and concurrent transmissions are arranged by the agents to the capacity of the network for the peripheral attachments to the sending station. The segmentation and reassembly maximizes a sender's transmission ability and allows the network to distribute the bandwidth usage over the network to prevent network congestion.

While various embodiments of the present invention have been described, it should be understood that they have been presented by way of example only and not limitation. The breadth and scope of the present invention should not be limited by any of the above-described exemplary embodiments but should be defined only in accordance with the following claims and their equivalents.

We claim:

1. A system for improved large file transfer over a packet network without affecting other network services, comprising:
   a) single or multiple paths in the packet network for data transmission of large intact packet files or large segmented packet files, regardless of packet order;
   b) a sender and a receiver coupled to the network for large file transfer greater than 10 MB therebetween;
   c) a bandwidth manager for the network or segment(s) thereof executing a guaranteed bandwidth reservation algorithm and providing senders with guaranteed bandwidth reservations for transfer over a single or multiple network paths of the large intact files or large segmented files; and
   d) a file forwarding and a receiving agent working in pairs in the same sub-network of a plurality of sub-networks associated with each sender and receiver and interacting with a bandwidth manager(s) to obtain multiple guaranteed bandwidth reservation(s) for the transfer of the large intact packet files or the large segmented packet files to a receiver over single or multiple network paths in the packet network or segments thereof optimizing the transfer of the large files over the packet network consistent with other services provided by the packet network.

2. The system of claim 1 further comprising means included in the agent interacting with the bandwidth manger managing a file transmission and segmentation and re-assembly of transferred files over a guaranteed bandwidth based on information contained in packets or sent by the file forwarding agent.

3. The system of claim 1 further comprising means included in the receiving agent for matching a file transferred to an associated guaranteed bandwidth reservation in multiple networks.

4. The system of claim 1 further comprising means included in the file forwarding agent for seeking guaranteed bandwidth reservations in different parallel packet networks from a bandwidth manager for the transmission of the large files to a receiver coupled to such different parallel packet networks.

5. The system of claim 1 wherein the packet network is publicly shared.

6. The system of claim 1 further comprising means for reassembling file segments received out of order using information contained in segments or control information provided by the file forwarding agent.

7. The system of claim 1 wherein the packet network is divided into sub-networks, each sub-network connected to different networks.

8. In a packet network including senders, receivers, at least one bandwidth manager, and a file forwarding and a receiving agent associated with each sender and receiver, a method for improved large intact packet file transfer greater than 10 MB over a packet network without affecting other network services, comprising the steps of:
   a) requesting a bandwidth reservation from a bandwidth manger executing a guaranteed bandwidth reservation algorithm by an agent for transmitting the large intact packet file, regardless of packet order over multiple guaranteed bandwidth in the packet network from a sender to a receiver;
   b) segmenting the large intact packet file into sections of packets, if necessary, and matching the segmented packet file sections to segmented reservation; and
   c) managing the file transmission and re-assembly of transferred files over multiple paths in the packet network or in different packet networks based on information contained in the packet or sent by the file forwarding agent.

9. The method of claim 8 further comprising the steps of:
   d) determining which different networks are to be used for file transmissions; and
   e) altering a guaranteed bandwidth reservation by the agent based on the suitability of a transfer of the reservation to the different packet networks.

10. In a packet network including senders, receivers, at least one bandwidth manager, and a file forwarding and receiving agent associated with each sender and receiver, a method for improved large file transfer over a packet network without affecting other network services, comprising the steps of:
   a) requesting a bandwidth reservation from a bandwidth manager by an agent for transmitting a file over the packet network in unitary or segmented form from a sender to a receiver;
   b) determining a maximum bandwidth capacity of an attached device to the network;
   c) determining the maximum bandwidth capacity to request from a bandwidth manager;
   d) performing a test to determine if the bandwidth capacity is non-zero;

e) performing a test to determine whether the bandwidth manager provided the requested bandwidth capacity;

f) repeating steps (b)–(e) until a guaranteed reservation is received;

g) segmenting a file when exceeding the bandwidth, and matching the file to the unitary or segmented reservation; and h) managing the file transmission and re-assembly of transferred files over multiple paths in the network or in different networks.

11. A system for improved large file transfer over a packet network, comprising:

a) a first sub-network connected to a sender station, the first sub-network including first and second agents connected to first multiple networks via first interim agents;

b) a first bandwidth manager connected to the second agent and providing bandwidth reservations in the multiple networks of the first sub-network;

c) a second sub-network connected to a second bandwidth manager, the second sub-network including third and fourth agents connected to second multiple networks via second interim agents; and d) said second bandwidth manager providing bandwidth reservation in the second multiple networks and connected to a receiver, multiple parallel paths existing in the first and second sub-networks for the transfer of data in segments between the sender and receiver, optimizing the transfer of data through the network for the most rapid delivery to the receiver.

12. A method for improved large file transfer over a packet network, comprising:

a) connecting a first sub-network to a sender station, the first sub-network including first and second agents connected to first multiple networks via first interim agents;

b) connecting a first bandwidth manager to the second agent and providing bandwidth reservations in the multiple networks of the first sub-network;

c) connecting a second sub-network to the first bandwidth manager, the second sub-network including third and fourth agents connected to second multiple networks via second interim agents; and d) providing bandwidth reservation in the second multiple networks by a second bandwidth manager connected to a receiver, multiple parallel paths existing in the first and second sub-networks for the transfer of data in segments between the sender and receiver, optimizing the transfer of data through the networks for the most rapid delivery to the receiver.

13. A method for obtaining a bandwidth reservation for a data transmission in a network, comprising:

a) determining the maximum data capacity of a device requesting a data transmission in the network;

b) determining the maximum bandwidth capacity to request a guaranteed bandwidth reservation (M) from a bandwidth manager based on the network and the device;

c) determining if the bandwidth capacity is non-zero;

d) ending the method if "no" or continuing the request if "yes";

e) determining whether the bandwidth manager provided a guaranteed reservation of M;

f) reducing the request to M', if "no";

g) cycling the request to the bandwidth manager until a guaranteed reservation is obtained; and h) segmenting the data transmission of the device for the reservation in the network.

14. The method of claim 13 further comprising;

i) receiving a reduction in bandwidth from the bandwidth manager;

j) reducing the bandwidth capacity of the device to match the reduced bandwidth;

k) determining if more bandwidth capacity is required by the device; and l) returning to step b) if "yes' and ending the method if "no".

15. A method of optimizing the transmission of large data files via multiple networks, comprising;

a) determining which networks are to be used for data transmission;

b) establishing an order of the multiple networks based on the suitability for the transfer the data files;

c) requesting and obtaining a bandwidth reservation from a bandwidth manager for each network in the order of the multiple network;

d) determining if the each network in the order of multiple networks has obtained a bandwidth reservation;

e) If "yes' ending the method; and f) if "no" returning to step c) and cycle through the networks reducing bandwidth requirements until a bandwidth reservation has been obtained for each network whereupon the method ends.

* * * * *